United States Patent [19]

Tsukada et al.

[11] 4,209,907

[45] Jul. 1, 1980

[54] DENTAL TREATMENT CHAIR ASSEMBLY

[75] Inventors: Naonobu Tsukada, Joyou; Katsuyoshi Nishimura, Kyoto, both of Japan

[73] Assignee: Kabushiki Kaisha Morita Seisakusho, Kyoto, Japan

[21] Appl. No.: 874,197

[22] Filed: Feb. 1, 1978

[30] Foreign Application Priority Data

Feb. 1, 1977 [JP] Japan .................................. 52-10450

[51] Int. Cl.² ............................................... A61C 19/00

[52] U.S. Cl. ....................................... 433/33; 297/191; 433/78

[58] Field of Search ............................ 32/22; 279/191

[56] References Cited

U.S. PATENT DOCUMENTS

| | | | |
|---|---|---|---|
| 3,259,430 | 7/1966 | Beach | 32/22 |
| 3,427,719 | 2/1969 | Gordon et al. | 32/22 |
| 3,733,481 | 5/1973 | Kuyt | 32/22 |
| 3,802,736 | 4/1974 | Valeska et al. | 297/191 |

FOREIGN PATENT DOCUMENTS

| | | | |
|---|---|---|---|
| 2129945 | 12/1972 | Fed. Rep. of Germany | 32/22 |

*Primary Examiner*—Louis G. Mancene
*Assistant Examiner*—John J. Wilson
*Attorney, Agent, or Firm*—Koda and Androlia

[57] ABSTRACT

The disclosure relates to a dental treatment chair assembly wherein the assembly is detachably positioned inside the backrest of the chair and comprises a number of cartridge boxes; each of the boxes contains therein an instrument and an extensible connecting pipe and means for assisting manual extension and reeling-in of the pipes from the top of the shoulder part of the backrest, whereby a dentist can arrange the type, number and position of dental instruments in compliance with his convenience and desire by arranging the cartridge boxes. Any instrument can be removed and repaired by withdrawing the cartridge box that contains the defective instrument.

6 Claims, 7 Drawing Figures

DENTAL TREATMENT CHAIR ASSEMBLY

BACKGROUND OF THE INVENTION

1. Field of the Invention

This invention relates to a dental treatment chair assembly designed to make it possible for a patient to undergo a dental procedure in his supine and sedentary posture and more particularly to improvements in the dental treatment chair assembly which comprises a chair and a backrest mounted on the back of the chair. The backrest is provided with a number of cartridge boxes, each of the boxes containing a dental instrument such as tooth grinding equipment, air syringe, suction syringe, etc. Each instrument has a connection with a cartridge box by a flexible connecting pipe which allows each instrument to be easily extended and retracted over the length necessary for the procedure.

2. Prior Art

In the prior art dental treatment chair assembly, means for extending and reeling the flexible connecting pipes are separately and directly mounted in a certain position of the backrest. Also the control devices for supplying the electric current, air, water, medical solution, etc., through the pipes to the instruments were also separately and directly mounted to the lower side or lateral side of the body of the assembly.

Accordingly, the conventional dental treatment assembly suffers from the following problems:

(a) The kind, number and position of the instruments attached to the assembly are those peculiar to the assembly, and once a dentist has purchased such an assembly, he can not make a rearrangement by himself as he wishes or likes, but because he has to order the maker of the assembly to make such an arrangement, the dentist has great inconvenience and disadvantages in terms of time and money.

(b) When something is wrong with the instruments, flexible pipes and their associated connection members, or control devices, the dentist has to suffer the inconveniences of having the entire chair out-of-service for repair.

SUMMARY OF THE INVENTION

In an effort to solve the problems of the kind described, this invention is directed to improvements in the conventional type dental chair assembly. According to the invention, the instruments and means for extending and reeling flexible connecting pipes are disposed in a group of cartridge boxes (hereinafter referred to as a first cartridge box) in the form of a kit, and this box is designed to be easily and detachably mounted by the user in the backrest. Similarly, the control devices are also stored in another group of cartridge boxes (hereinafter referred to as a second cartridge box) in the form of a kit, and this box is easily and detachably mounted in the backrest of the dental chair assembly. Furthermore, in a preferred embodiment of the invention, the two groups of cartridge boxes are disposed in an adjacent relation with each other so as to permit the boxes to make the most effective use of the space the boxes occupy.

A preferred embodiment of the invention will now be described in detail with reference to the accompanying drawings.

DETAILED DESCRIPTION OF THE INVENTION

Figure 1:
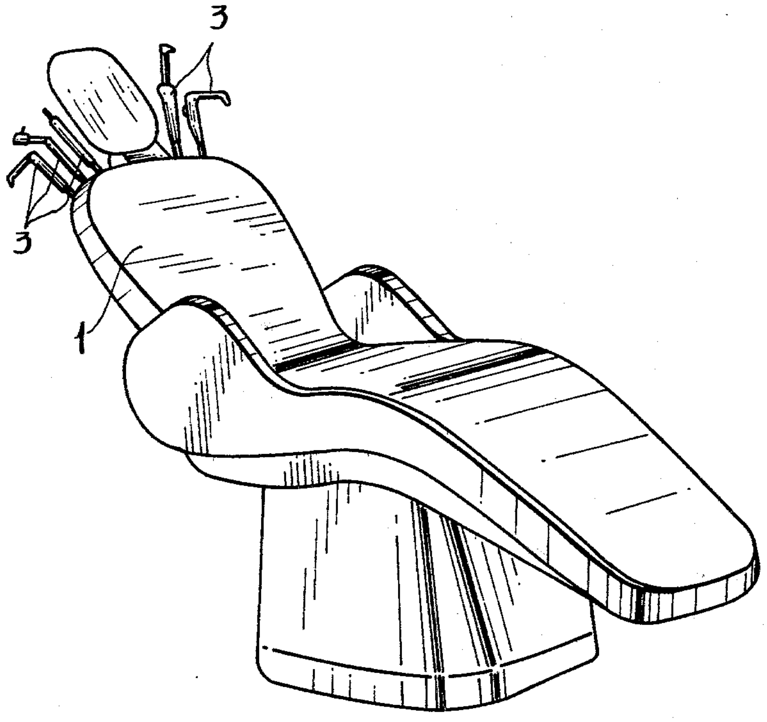
FIG. 1 is a perspective view of a dental treatment chair assembly according to this invention.

The structure of this invention includes first cartridge boxes each of which has an instrument 3 extending above the top thereof. Each cartridge box also has means (a) for extending all reeling flexible connecting pipes 2 therein are detachably mounted inside a backrest 1. In addition thereto second cartridge boxes 5 each contain control devices (b) for controlling the power, air, water and medical solution to be supplied through the connecting pipes 2 to the instruments 3. The second cartridge boxes are likewise mounted detachably inside the backrest 1.

Figure 2:
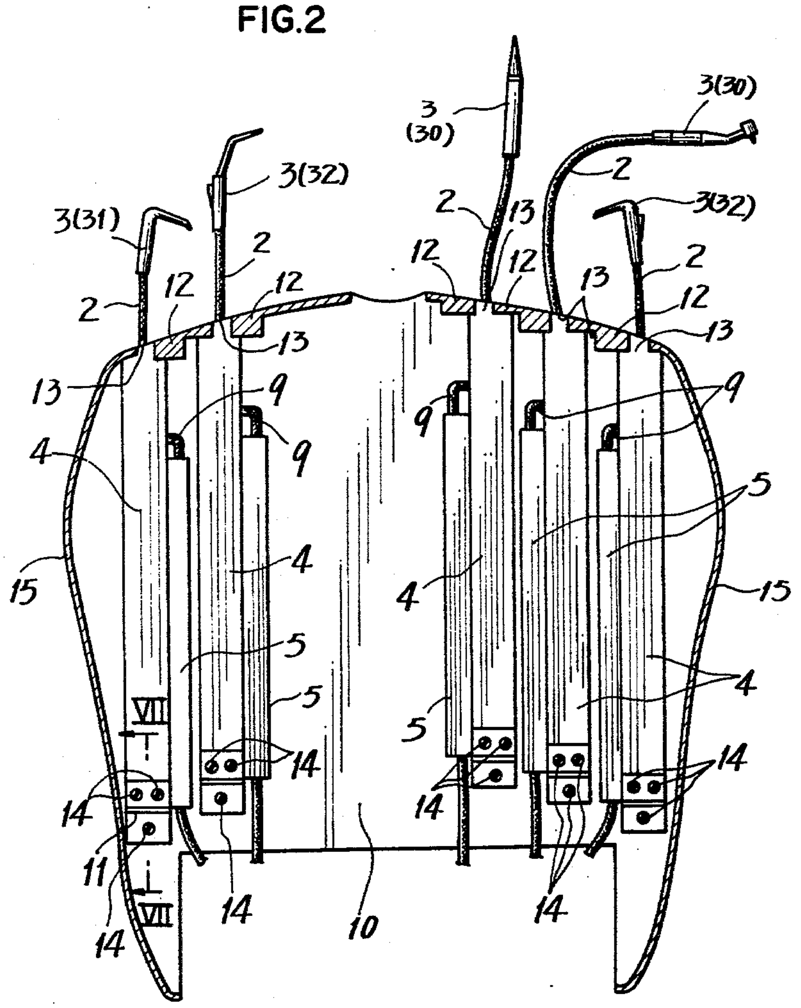
FIG. 2 is a front view of a backrest of the chair assembly shown in FIG. 1.
Figure 3:
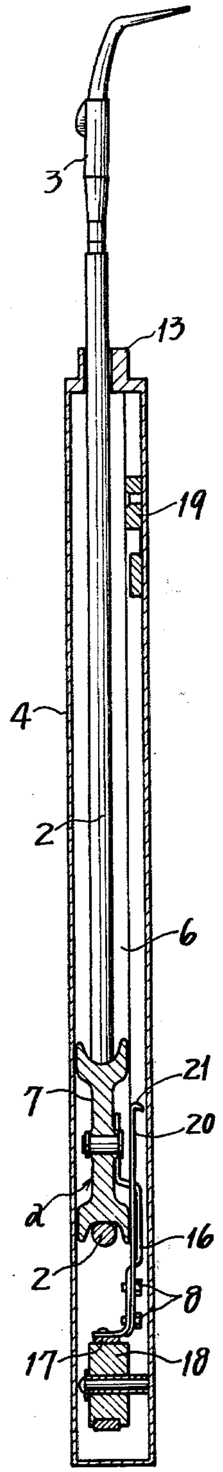
FIG. 3 is a sectional front view of a first cartridge box for flexible connecting pipes.
Figure 4:
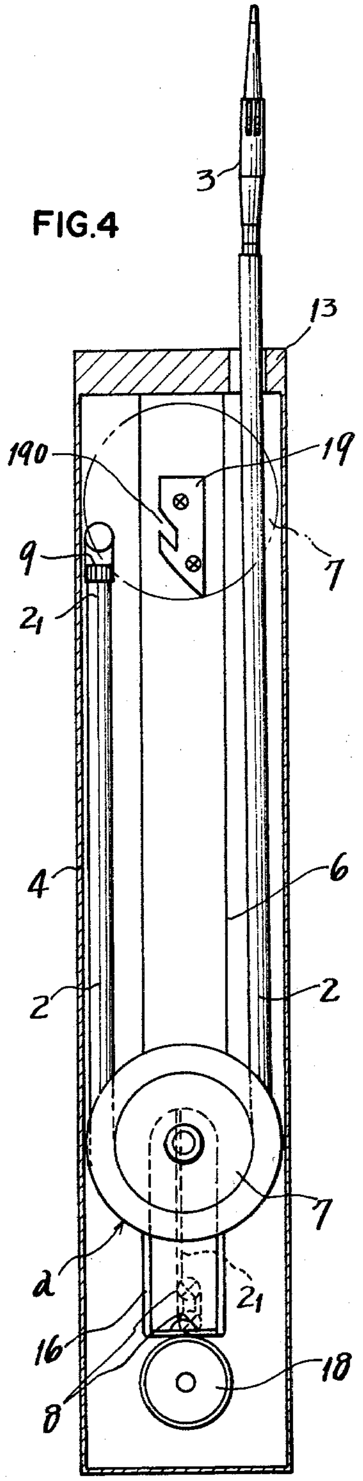
FIG. 4 is a side view of the first cartridge box.

Now, the embodiment illustrated is shown as having air-driven turbine handpieces 30 for cutting the tooth, a liquid syringe 31 for rinsing, and a vacuum syringe 32 for suction as instruments 3 as shown in FIG. 2. In correspondence with the instruments 3 described above, first cartridge boxes 4 and second cartridge boxes 5 (respectively five in all) are shown. The first cartridge boxes 4 incorporate means (a) for extending and reeling flexible connecting pipes 2 respectively and are provided with the instruments extending from the top of the backrest. The means (a) for extending and reeling the pipes 2 as shown in FIGS. 3 and 4, comprises a pulley 7 movable along a guide rail 6. A flexible pipe 2 is reeved through the pulley 7 which is extensible upwardly. A flat spiral spring 17 is free at the internal spiral end and is connected fixedly at the external spiral end to the pulley 7 to provide returning resilience with respect to the upward movement of the pulley. The initial end 21 of the flexible connecting pipe 2 inside the box 5 is separated by a pipe joint 9 from the main pipe side and is connected to the joint 9.

Figure 7:
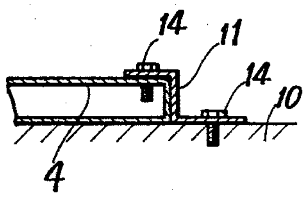
FIG. 7 is a sectional view taken along the line VII—VII of FIG. 2.

As a manner of fixing the first cartridge box 4 to the backrest 1, the box 4, as shown in FIGS. 2 and 7, is brought into contact with the inside surface 10 of the backrest 1 to extend along the body axis of a patient. Cartridge box 4 is fixed at the lower end portion by a metal fixture 11 to the backrest and is fixed at the top end portion by a jaw of the box 4, see FIG. 3. The top end portion 13 formed at the top end portion of the box 4 is inserted and supported within the pedestal 12, see FIG. 2, formed inside of the shoulder of the backrest 1. The metal fixture 11 is, as shown in FIG. 7, a bent metal fixture and is detachable by operation of screws 14. At both side edges of the backrest 1, rims 15 are formed and the top surface of the pedestal 12 and the top surfaces of the rims 15 are designed to be flush with each other. A back cover (not shown) is put on the pedestal 12 and rims 15 so that the backrest 1 can completely conceal the first cartridge boxes 4 (and second cartridge boxes 5) disposed therein from view. Part of the flexible connecting pipe 2 is exposed from the top of the box 4 so as to permit the easy drawing by the dentist of the instrument as shown in FIGS. 2, 3 and 4.

A description will now be given of the detailed structure and function of the means (a) for extending and reeling the pipes 2 contained in the first cartridge box 4, see FIGS. 3 and 4. A pulley 7 can freely move along a guide rail 6 laid in the box 4 longitudinally of the box. The flexible connecting pipe 2 has the instrument 3 mounted at the end and is reeved through the pulley 7. The pulley 7 has one end of the connection fitting 16 secured thereto as shown in FIG. 3, and the other end of the fitting 16 is connected to the external end of the spiral spring 17. The flat spiral spring 17 is wound on a reel 18 journaled rotatably below the pulley 7 in the box 4 and the internal end of the spiral spring 17 is free. Accordingly, the pulley 7 is normally urged downwardly in the drawing and is positioned in the lowermost position shown in FIGS. 3 and 4. In this position the flexible connection pipe 2 is drawn downwardly in the intermediate between the fixed supporting point side, i.e., pipe joint 9 side and the instrument 3 side on the free end side, so that the pipe 2 is reeved over the pulley without sagging but substantially in a tensioned state. Accordingly, when the pipe 2 is drawn upwardly, the spring 17 imparts returning resilience to such an upward drawing force. It will be understood from the fact that the internal spiral end is not fixed to the reel 18 that such a returning force will become substantially uniform irrespective of the distance the pipe 2 being drawn out or extended.

In order to stop the pulley 7 in the upper position shown in dashed lines in FIG. 4, an engageable fitting 19 is provided in position inside the box 4. In correspondence thereto is provided an engageable spring 20 fixed at one end by a fixture 8 to the connection fitting 16. This engageable spring 20 is at the upper end formed with a hook 21, while the engageable fitting 19 is formed with a groove 190. Accordingly, when the pulley 7 that reaches the position of the groove 190 being engaged by the hook 21 of the engageable spring 20, the pulley 7 is prevented from being drawn back by the resilience of the spring 17 and is stopped in the upper position. In this latched state, the resilience of the spring 19 does not act upon the pipe 2, and consequently the dentist does not suffer any effect from the resilience of the spring upon the operation of the instrument 3. When it is desired to retract the pipe 2 again, it is only necessary to draw out the pipe 2 slightly and to move the pulley 7 a little upwardly. Then, the hook 21 moves away from the groove 190 and thereafter the pulley 7 would be drawn downwardly along the rail 6 by the resilience of the spring 17. Also, since the structure of the paying-out and reeling means is well-known in Japanese Utility Model Application No. 137,093/73 (Japanese Utility Model Publication for Public Inspection No. 83,887/75), a further description thereof is omitted.

Figure 5:
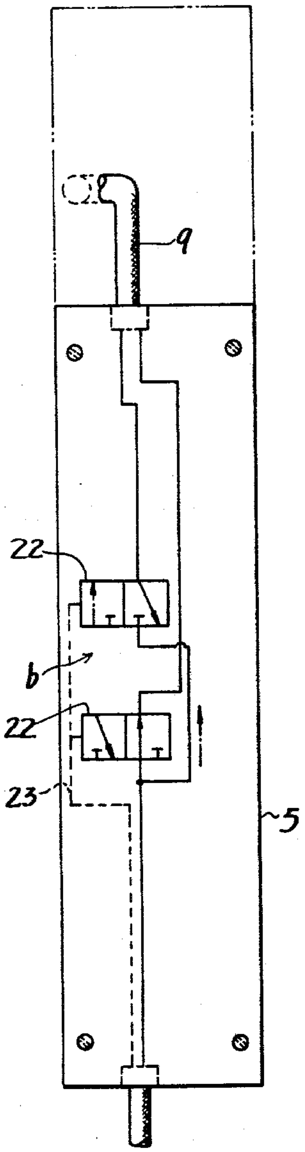
FIG. 5 is a front view of a second cartridge box.
Figure 6:
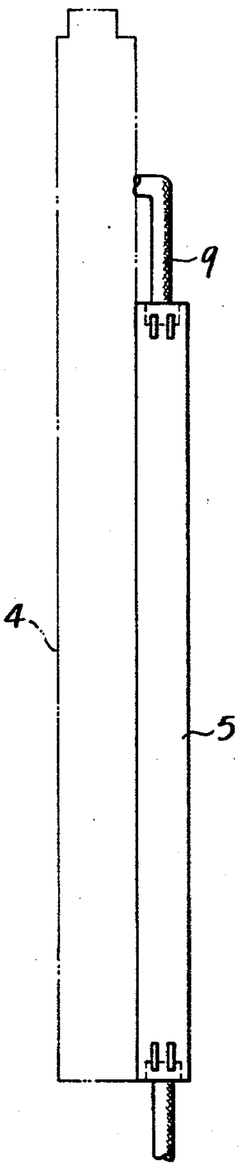
FIG. 6 is a side view of the second cartridge box.

Next, the second cartridge box 5 contains therein a control device (b), as shown in FIGS. 5 and 6, namely, all the necessary control devices for satisfying the required conditions on the instruments, such as a valve 22 for supply, suspension and switching of air for driving an air turbine, a means 23 for giving an electric signal for sending a switching signal, on-and-off valves for air, water, and medical solution to syringes (not shown), a means for starting and bringing the turbine to a sudden stop, etc. The manner of mounting this box 5 to the backrest is the same as that of the first box 4, and the fixture 11 and other suitable fixing means are used. Both boxes 4 and 5, as shown in FIG. 2, are preferably disposed in an adjacent relation with each other (a bilateral relation herein), or are disposed in such an overlying relation as the box 5 lies immediately below the box 4 although not shown. The disposition of the boxes in the manner mentioned above is desirable in that it reduces the space occupied to a minimum. There is interposed a pipe joint 9 between the boxes 4 and 5, and the initial end of the connection pipe 2 in the box 5 and the final end of the pipe 2 in the box 4 are detachably connected to the joint 9. Also, it is understood that the trunk side of the pipe 2 in the box 5 is connected the supply sources of air, water, etc., to a suction compressor or the like.

This invention is of the construction described above, and can be said to provide a dental chair assembly which meets the needs of the time in that the assembly is detachably provided inside the backrest thereof with first cartridge boxes 4, each of the boxes contains therein an instrument, a flexible connection pipe 2 connected to the instrument, and a means (a) for paying out and reeling the pipe 2 freely from the top of the shoulder part of the backrest 1 and in that the assembly is also likewise detachably provided inside the backrest with second cartridge boxes 5, each of the boxes 5 being associated with each of the first boxes 4 and having a control device (b) disposed therein, and in consequence after the user purchased the assembly, when he desired to make some addition or change of position of the instruments 3 according to his own way of use, method of treatment or liking, he can satisfy his requirements by replacing each of the first boxes 4 with a different one or attaching new purchased parts to the box 4 without the help of the maker, thus can greatly save the time and cost necessary therefore and can also obtain the same benefit by replacing the boxes 4 and 5 with new ones when the assembly is in part out of order.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed therein is for the purpose of description and not of limitation.

We claim:

1. A dental treatment chair assembly comprising:

a dental treatment chair, a backrest forming part of said chair, a shoulder part on said backrest, flexible connecting pipes extending from said shoulder part of said backrest;

instruments on said flexible pipes, the improvement comprising:

a plurality of first cartridge boxes, each of said boxes containing a flexible pipe and means for permitting extension and causing retraction of its flexible pipe therein, each said flexible connecting pipe having a fixed end position inside its first cartridge box, each said fixed end being detachably connected by a detachable pipe joint so that each first cartridge box can be removed, an instrument mounted on each said connecting pipe so that said dental treatment instrument can be extended and retracted to retract the corresponding dental treatment instrument, said cartridge boxes being positioned so that said instruments are positioned to extend over the top of the shoulder part of the backrest; and a plurality of second cartridge boxes, each of said second cartridge boxes being removably attached to a selected one of said first cartridge boxes to be associated therewith, each said second cartridge boxes comprising a controller to control the function of its associated first cartridge boxes, said second cartridge boxes being positioned in said dental treatment chair backrest.

2. A dental treatment chair assembly according to claim 1 wherein said first and second cartridge boxes are disposed in an adjacent relation with each other and both boxes are provided therebetween with detachable pipe joints for coupling each end of flexible connecting pipes.

3. A dental treatment chair assembly according to claim 2 wherein said first and second cartridge boxes are in such an adjacent relation with each other as one box is disposed by the side of the other.

4. A dental treatment chair assembly according to claim 2 wherein said first and second cartridge boxes are in such an adjacent relation with each other as one box lies above the other.

5. A dental treatment chair assembly according to claim 1 wherein said second cartridge boxes each contain therein a selected control device for selectively controlling electric power, air, water and medical solution supplying means, motor, and turbine.

6. A dental treatment chair assembly comprising:

a dental treatment chair, a backrest forming part of said chair, a shoulder part on said backrest, flexible connecting pipes extending from said shoulder part of said backrest;

instruments on said flexible pipes, the improvements comprising:

a plurality of first cartridge boxes, each of said first boxes containing a flexible pipe and means, for permitting extension and causing retraction of its flexible pipe therein, each of said flexible pipes having a fixed end detachably mounted in its first cartridge box, an instrument mounted on each said connecting pipe so that the dental treatment instrument can be extended or retracted to retract the corresponding dental treatment instrument, said cartridge boxes being positioned so that said instruments are positioned to extend over the top of the shoulder part of the backrest, said means for permitting extension and causing retraction comprising a pulley movably mounted in each of said first cartridge boxes, said flexible pipe extending around its pulley and having one of said dental treatment instruments secured to the other end thereof, said other end of said flexible pipe and said dental treatment instrument being positioned exteriorly of the corresponding first cartridge box, said pulley being resiliently urged to move in said first cartridge box in a direction to retract said other end and said dental instrument, an engageable fitting within each of said first cartridge boxes, said engageable fitting being positioned to engage the corresponding pulley when said pulley is positioned in its first cartridge box with said other end of said flexible pipe and said dental instrument extended so that said dental instrument can be employed in a dental procedure without retractive force on said flexible pipe; and a plurality of second cartridge boxes, each of said second cartridge boxes being removably attached to a selected one of said first cartridge boxes to be associated therewith, each said second cartridge boxes comprising a controller to control the function of each associated first cartridge box, said second cartridge boxes being positioned in said dental treatment chair backrest.

* * * * *